United States Patent [19]

Burk

[11] Patent Number: 4,730,492

[45] Date of Patent: Mar. 15, 1988

[54] MEASURING THE SPEED OF ULTRASOUND IN A MOVING WEB OF PAPER

[75] Inventor: Gary N. Burk, Columbus, Ohio

[73] Assignee: AccuRay Corporation, Columbus, Ohio

[21] Appl. No.: 862,297

[22] Filed: May 12, 1986

[51] Int. Cl.[4] .............................................. G01N 29/04
[52] U.S. Cl. ......................................... 73/597; 73/159
[58] Field of Search .................. 73/596, 597, 159, 639; 340/870.29

[56] References Cited

U.S. PATENT DOCUMENTS

| | | | |
|---|---|---|---|
| 4,109,998 | 8/1978 | Iverson | 340/870.29 |
| 4,291,577 | 9/1981 | Baum et al. | 73/597 |
| 4,404,559 | 9/1983 | Renner | 340/870.29 |
| 4,574,634 | 3/1986 | Pappano | 73/597 |

Primary Examiner—Stewart J. Levy
Assistant Examiner—Louis M. Arana

[57] ABSTRACT

Disclosed are apparatus and methods for producing electrical signals that can be used to measure the speed of ultrasound in a moving web of paper. The apparatus employs a hollow cylinder in which a plurality of transducers are positioned to contact the web. Power supplied to the cylinder through mercury slip is filtered by power conditioning circuitry in the interior of the cylinder, thus enabling the delivery of clean electrical pulses to the emitting transducers. Signals from the receiving transducers are delivered to voltage-to-frequency converter circuitry in the interior of the cylinder, and the resulting electrical frequency signals are converted to optical frequency signals. The optical signals are then communicated across an air gap to receptors which are external to the cylinder. Thus, signals from which measurements of the speed of ultrasound can be derived are provided substantially free from noise generated by transmission through slip rings.

10 Claims, 2 Drawing Figures

4,730,492

MEASURING THE SPEED OF ULTRASOUND IN A MOVING WEB OF PAPER

TECHNICAL FIELD OF THE INVENTION

This invention concerns measurement of the speed of ultrasound through a moving web. More particularly, the invention concerns apparatus and methods for producing and communicating low-noise signals that can be used to measure the speed of ultrasound in a moving web of paper with improved accuracy.

In the manufacture of paper products, certain quality control tests relating to paper strength cannot as yet be reliably performed on-line. Consequently, when static tests reveal deficiencies in strength for a sample of paper, a significant period of time may have elapsed between production of the sample and discovery of the quality defect. If the paper machine which made the sample has manufactured defective product during that period, then the manufacturer suffers the costs associated with the non-recoverable material produced and, more importantly, the production time lost.

The speed of ultrasound through paper is known to be related to various measures of paper strength. Given the above, it is clear that there is a need for a system which can reliably measure that speed during production.

BACKGROUND ART

An on-line ultrasonic velocity gauge is the subject of U.S. Pat. No. 4,291,577 Baum et al., the disclosure of which is herein incorporated by reference. The invention of Baum provides an ultrasonic transducer in each of two wheels that ride on a moving web and that are axially aligned across the width of the web. The circumferential positions of the transducers relative to their respective wheels are common so that the transducers contact the web at substantially the same time. The wheels have mercury slip rings for electrical communication to an external control unit which apparently serves as both a signal processor and power conditioning means. As explained in the description of the invention, the slip rings generate electronic noise which makes it difficult to obtain signal to noise ratios that are sufficiently large to enable accurate measurement. In addition, precise measurement of ultrasonic propagation time is difficult to achieve with only one receiving transducer because its electro-acoustical properties may vary with changes in environmental conditions such as temperature, and because electro-acoustical delays in the transducer itself make it difficult to accurately determine propagation time. One can compensate for the latter problem by providing two receiving transducers along each line of measurement that are positioned at different distances from the source of ultrasound. This is exemplified in U.S. Pat. No. 4,574,634 Pappano, the disclosure of which is herein incorporated by reference.

If one desires to use existing systems to measure the speed of ultrasound at several zones across the width of the web, then at least two major problems are presented. First, if the existing system accomplishes the desired result through the use of a conventional web-traversing mechanism, the physical contact between the web and the rotating wheels may cause web damage and machine downtime. Second, if several wheels are used with a single transducer in each wheel, the formentioned problem of low signal to noise ratios is compounded.

An important object of this invention is to provide apparatus and methods for eliminating major sources of electronic noise in systems which measure the speed of ultrasound in a moving web of paper.

SUMMARY OF THE INVENTION

This invention provides apparatus and methods for producing and communicating low-noise signals that, when combined with known distances between a first transducer and each of a plurality of second transducers, enable measurement of the speed of ultrasound in a moving web of paper.

The invention employs a hollow cylinder having electronic circuitry in its interior. The first and second transducers are disposed in the cylinder and have portions which protrude above the surface of the cylinder for contact with the web.

Electrical power is supplied to the interior of the cylinder through coupling means. The interior circuitry includes means for conditioning the power to reduce electrical noise generated by the coupling means, and also includes means for sending electrical pulses to the first transducer. The first transducer receives these pulses and delivers corresponding ultrasonic pulses to the web that propagate through the web and are received by the second transducers. The second transducers then deliver corresponding electrical signals to the interior of the cylinder. These signals correlate with the speed of ultrasound in the web and may be communicated to receptors which are external to the cylinder. These signals may also be frequency-modulated prior to such communication, and the communication may be my means of optical telemetry.

The communicated signals may be further conditioned and processed to produce a measurement of the speed of ultrasound in the web.

The second transducers may be arranged so that measurement of speed can be made in both the machine and cross-machine directions, and a plurality of first transducers may be provided so that measurement can be made in each of several zones that are spaced in the cross-machine direction.

DESCRIPTION OF THE PREFERRED EMBODIMENT

Figure 1:
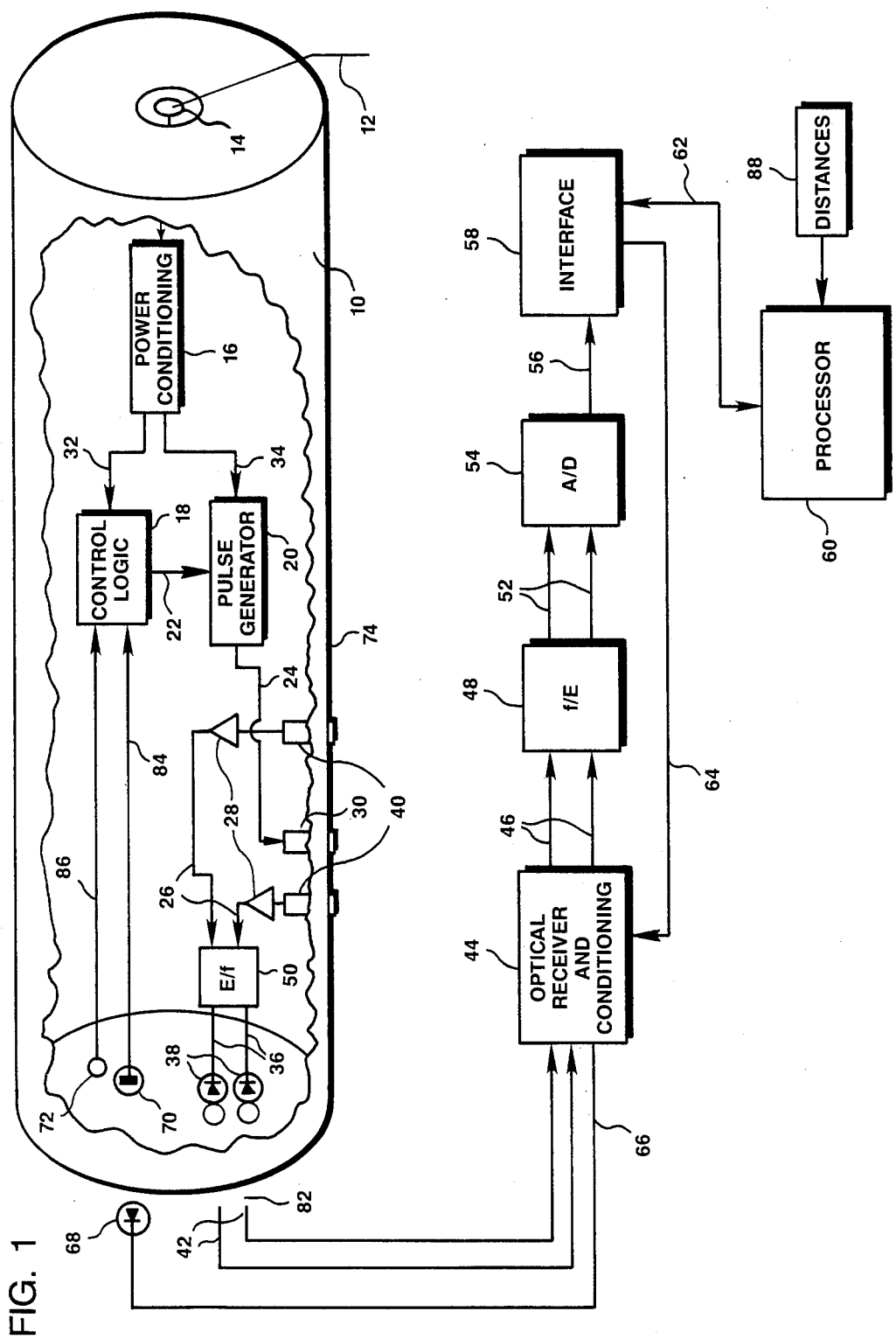
FIG. 1 is a schematic illustration of an embodiment of the invention.
Figure 2:
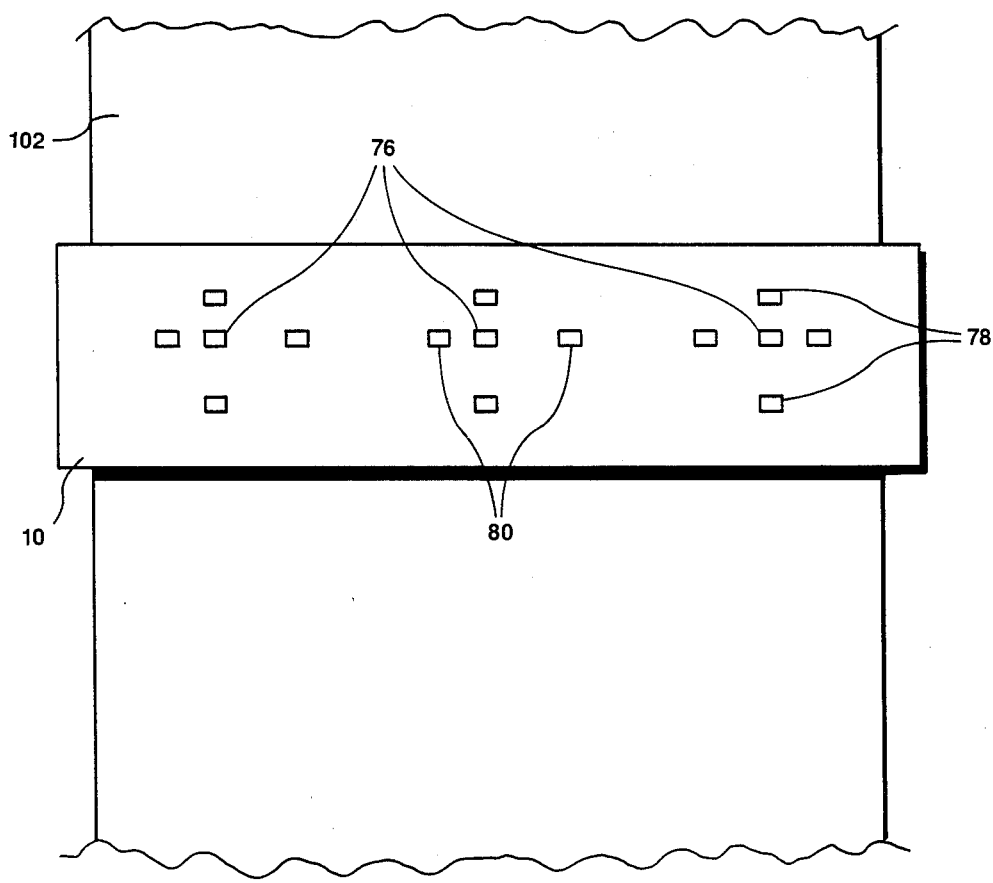
FIG. 2 is a schematic drawing which illustrates how the embodiment of FIG. 1 can be modified to provide measurement in both the machine and cross-machine directions.

Referring to FIG. 1 of the drawings, a rotating cylinder 10 having a hollow interior houses electronic hardware necessary for producing electrical signals that can be used to measure the speed of ultrasound in a moving web 102 (FIG. 2).

Electrical power is transmitted from a remote source as indicated at 12, and coupled to the interior of the cylinder 10 by coupling means 14 such as mercury slip rings. Electrical noise generated by the coupling means 14 is filtered by conventional power conditioning means 16 which provides power to a control logic unit 18 and a pulse generator 20 as indicated at 32 and 34, respectively. The pulse generator 20 sends electrical pulses to a first transducer 30 as shown at 24. Thus, the first transducer 30 receives electrical pulses that are substantially free of noise generated by the coupling means 14.

As illustrated in FIG. 1, second transducers 40 are spaced from the first transducer 30 at different distances. This arrangement compensates for error in the computation of ultrasonic speed which results from electrical delays in the circuitry and electro-acoustic delays in the transducers. Thus, whatever these delays are, they can be cancelled out by subtraction of the measured propagation times.

All transducers have portions which protrude above the exterior surface 74 of the cylinder 10 and contact the moving web 102. When the first transducer 30 is in contact with the web 102 and receives electrical pulses from the pulse generator 20, it delivers corresponding ultrasonic pulses which propagate through the web and are received by a plurality of second transducers 40 (Only two are shown in FIG. 1). The second transducers 40 then deliver corresponding electrical signals as indicated at 26, which may be amplified as shown at 28. Since the distances between the first transducer 30 and the second transducers 40 are fixed inputs 88 to an external processor 60, and since the electrical signals 26 indicate the times at which the first transducer delivered and the second transducers received ultrasonic pulses, the electrical signals can be used to measure the speed of ultrasound through the web 102.

The electrical signals 26 will typically be voltage amplitude signals that are modified by a voltage-to-frequency converter 50 to produce output frequency signals 36 for communication to external receptors. The means by which this communication is achieved may take the form of transmitting the signals through slip rings to wire receptors. However, it will be recognized that this will add noise to the output signals 36, requiring more signal conditioning and processing than would otherwise be necessary. To eliminate this problem, the embodiment illustrated in FIG. 1 provides for communication by optical telemetry wherein the output signals 36 are converted to optical signals by light-emitting diodes 38. These signals are transmitted across an air gap 82 (exaggerated for purposes of illustration) to optical fibers 42 which further transmit the signals to an optical receiver and conditioning unit 44. The optical receiver and conditioning unit 44 reconverts the optical signals to electrical frequency signals 46, which are in turn converted to voltage signals 52, as shown at 48. The voltage signals 52 are digitized as indicated at 54, and the resulting digital signals 56 are sent to a processor 60 through an interface 58.

When measurement is required, the processor 60 sends a command signal through communication links indicated at 62, 64, and 66 to a light-emitting diode 68 which transmits the signal to a photodetector 70. The control logic unit 18 receives the command by a photodetector response as shown at 84 and, upon receiving a second response 86 from a position indicator 72 sends a firing signal 22 to the pulse generator 20 which sends electrical pulses 24 to the first transducer 30.

The illustration in FIG. 1 shows three transducers, two which receive and one which transmits ultrasound. However, it is desirable to provide for measurement in both the machine and cross-machine directions. In addition, it may be desirable to measure the speed in each of several cross-machine zones of the web 102. Accordingly, FIG. 2 shows that the cylinder 10 may extend across the entire width of the web 102 and that first transducers 76 may be placed in each of a plurality of cross-machine zones (Only three such zones are illustrated in FIG. 2). Associated with each first transducer 76 are two pairs of second transducers 79, 80. A first pair of second transducers 80 provides for measurement of propagation time in the cross-machine direction as is shown for the second transducers 40 of FIG. 1. A second pair of second transducers 78 having an alignment that is perpendicular to that of the first pair provides for measurement of propagation time in the machine direction.

Since it may be desirable to measure the speed of both compressional (longitudinal) and shear waves, a second series of transducers (not shown) may be placed on the opposite side of the cylinder 10 so that both modes of propagation can be measured in both the machine and cross-machine directions. It will be recognized that the web 102 must wrap the cylinder 10 enough to provide simultaneous contact of the second transducers 78 with the web.

From the above description it is seen that the invention provides three important and distinct advantages in measuring the speed of ultrasound in a moving web. First, by providing a hollow cylinder 10 in which the control logic, power conditioning, and pulse generator circuitry is placed, a comparatively noise-free signal can be delivered to the first transducer 30. This results in higher signal-to-noise ratios for the output signals 36 than would be obtained if the circuitry were outside the cylinder. Second, when output signals 36 are communicated to the outside of the cylinder 10 by optical telemetry, the noise that would be generated by communicating through slip rings is avoided. Third, by placing the voltage-to-frequency converter 50 in the interior of the cylinder 10, the amplitude signals 26 from the second transducers 40 can be frequency-modulated to produce cleaner output signals 36 for communication to external receptors.

While the invention has been described in terms of preferred embodiments, the description is not intended to be restrictive. Those skilled in the art will recognize that modifications can be made without departing from the spirit and scope of the invention.

What is claimed is:

1. An apparatus for producing electrical signals that are to be used in measuring the speed of ultrasound through a moving web of paper, comprising:
   (a) a cylinder having a hollow interior and being adapted to contact the moving web;
   (b) means for coupling electrical power from a remote source to the interior of the cylinder;
   (c) means, disposed within the interior of the cylinder, for conditioning the electrical power to reduce electrical noise resulting from transmission of power through the coupling means;
   (d) a first transducer positioned in the cylinder to receive electrical pulses from the interior of the cylinder and to deliver corresponding ultrasonic pulses to the web;
   (e) means, disposed within the interior of the cylinder, for sending electrical pulses to the first transducer; and
   (f) a plurality of second transducers positioned in the cylinder to receive ultrasonic pulses from the web and to deliver corresponding electrical signals to the interior of the cylinder.

2. An apparatus as in claim 1 further comprising means for communicating the electrical signals from the interior of the cylinder to receptors which are external to the cylinder.

3. An apparatus as in claim 1 comprising a plurality of first transducers which receive electrical pulses from the sending means.

4. An apparatus as in claim 1 further comprising means, disposed within the interior of the cylinder, for converting the electrical signals to optical signals and means for communicating the optical signals to receptors which are external to the cylinder.

5. An apparatus as in claim 4 comprising a plurality of first transducers which receive electrical pulses from the sending means.

6. An apparatus as in claim 5 further comprising means for converting the optical signals to electrical signals and means for processing the electrical signals to produce a measurement of the speed of ultrasound in the web.

7. In a method for measuring the speed of ultrasound in a moving web, which method employs a plurality of transducers arranged in a common cylinder, the steps comprising:
 (a) sending electrical pulses to at least one of the transducers from a source that is interior to the cylinder,
 (b) converting the electrical pulses to ultrasonic pulses that are delivered to the web,
 (c) receiving the ultrasonic pulses from the web,
 (d) converting the received ultrasonic pulses to electrical signals, and
 (e) delivering the electrical signals to the interior of the cylinder.

8. A method as in claim 7 further comprising the step of frequency-modulating the electrical signals in the interior of the cylinder to produce frequency signals.

9. A method as in claim 8 further comprising the step of communicating the frequency signals by means of optical telemetry to receptors which are external to the cylinder.

10. A method as in claim 9 further comprising the step of processing the communicated signals to produce a measurement of the speed of ultrasound in the web.

* * * * *